United States Patent [19]

Duncan

[11] 4,380,281
[45] Apr. 19, 1983

[54] ASSOCIATED RUNNING GEAR AND PILER IMPROVEMENTS IN A TWO ROW HARVESTER AND PILER

[75] Inventor: Richard A. Duncan, Thibodaux, La.

[73] Assignee: Cane Harvest Inc., Thibodaux, La.

[21] Appl. No.: 215,999

[22] Filed: Dec. 12, 1980

[51] Int. Cl.³ .................. B65G 41/00; B65G 65/06
[52] U.S. Cl. .................. 198/304; 56/14.3; 180/63; 180/212
[58] Field of Search .................. 198/304–305; 56/192, 14.3, 14.5, 16.6; 180/212, 63

[56] References Cited

U.S. PATENT DOCUMENTS

| Re. 23,083 | 2/1949 | Andrews et al. | 56/16.6 X |
|---|---|---|---|
| 2,669,829 | 2/1954 | Pugh | 56/192 |
| 2,942,677 | 6/1960 | Gray | 180/212 |
| 3,448,564 | 6/1969 | Chauffe | 56/14.3 |
| 3,481,121 | 12/1969 | Broussard | 56/14.3 |
| 4,232,775 | 11/1980 | Duncan | 198/304 |

Primary Examiner—James L. Jones, Jr.
Assistant Examiner—Douglas D. Watts
Attorney, Agent, or Firm—James B. Lake, Jr.

[57] ABSTRACT

A two row harvester running gear is of a tricycle type with all wheels being hydraulically driven and with a center rear wheel that is steerable and smaller than the two front wheels. The running gear configuration provides sharper turns in muddy fields without bulldozing, and space for side mounting pilers adjacent the front wheels and inboard of them to minimize the number and degree of changes of direction in cut cane travel. Closed loop and parallel connections of an hydraulic power system rotates all wheels for a common linear speed, and at torques relative to the size and positioning thereof for maximum traction.

3 Claims, 4 Drawing Figures

1

ASSOCIATED RUNNING GEAR AND PILER IMPROVEMENTS IN A TWO ROW HARVESTER AND PILER

BACKGROUND OF THE INVENTION

The invention relates generally to cane harvesters and pilers, and more particularly to associated running gear and piler improvements in two row harvesters and pilers.

The prior art comprises the following U.S. patents:

(a) Chauffe, No. 3,448,564 which teaches a tricycle running gear having a steerable front wheel and driven rear wheels;

(b) Broussard No. 3,481,121 which teaches a tricycle running gear having a steerable rear wheel in alignment with a front wheel, both front wheels being driven; and (c) Pugh, No. 2,669,829 teaches a single side mounted piler for piling to a side and rear, the piler being parallel to and transversely offset from the harvester longitudinal centerline and requiring right anle turns of the cut cane in piling.

The invention improves on the prior art and on my prior U.S. Pat. No. 4,232,775 for Structional and Operational Improvements for a Two Row Harvester and Piler, in that the invention teaches a tricycle running gear in which all wheels are driven and a center rear wheel is also steerable for providing sharp turns and better tracking in muddy fields, and also provides additional spaces for side mounting pilers inboard of front wheels and forward of rear wheel. The invention also teaches pilers adapted to pivoting in said spaces and that extend unequally beyond said rear wheel for pivoting between piling positions with minimum angular motion, and minimum interference of falling cane from opposed pilers.

SUMMARY OF THE INVENTION

The invention provides a steerable rear wheel that is also driven to eliminate rear wheel bulldozing in muddy fields, stop reverse rotation of the rear wheel, and driven with less torque than the front wheels which are larger to provide most of the traction between field and running gear. The centered rear wheel provides spaces on each side thereof for closer together and longer pilers mounted in approximate alignment with adjacent cane rows for minimum pivoting between piling positions.

It is an object of the invention to provide simple, economical running gear for two row cane harvesting and four row piling.

Another object of the invention is to provide cut cane pilers requiring minimum pivoting to pile four row heap piles behind and to the sides of a two row harvester.

DESCRIPTION OF THE PREFERRED EMBODIMENT

Figure 1:
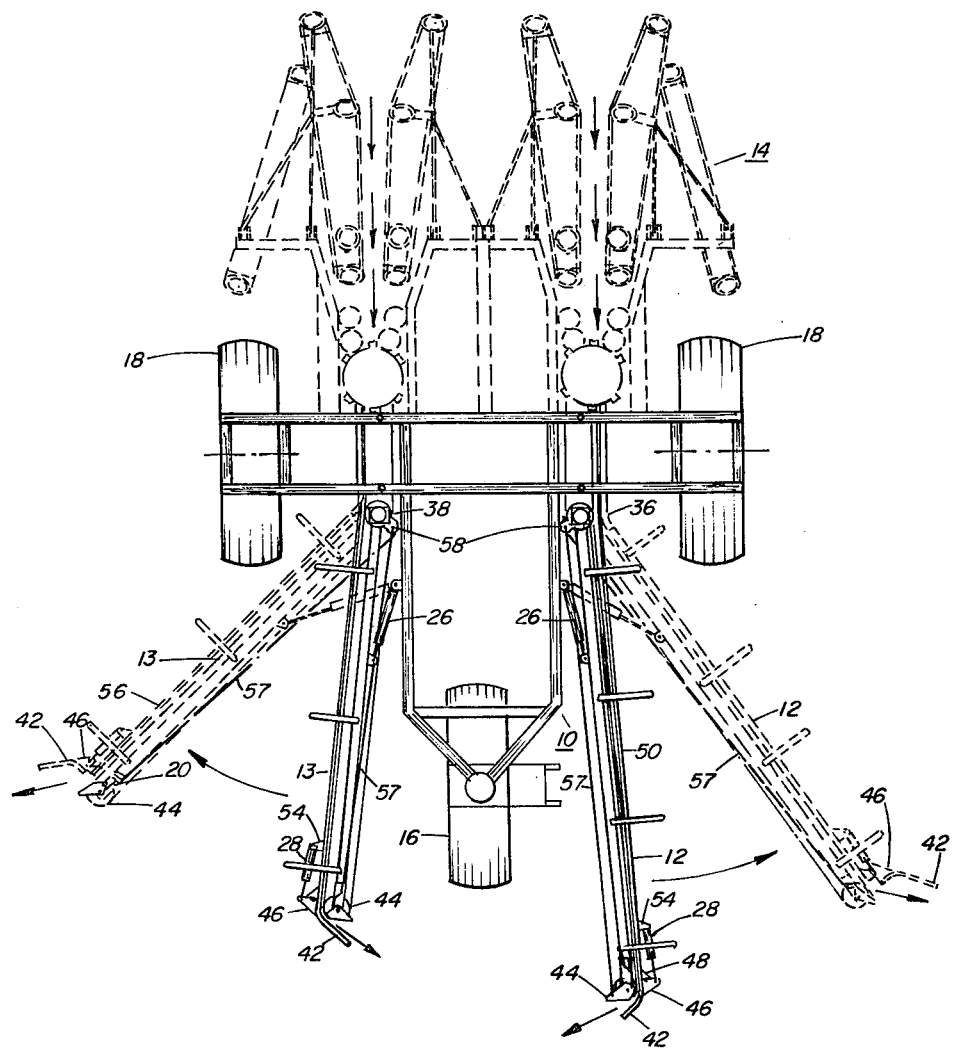
FIG. 1 is a plan view of the invention with pilers shown in position for piling behind a two row harvester, and in dotted lines for piling to the sides thereof, and for showing cane cutting parts not involved in the invention.

Referring to FIGS. 1-4, the invention comprises running gear and pilers improvements in a two row cane harvester with four row piliers. A tricycle running gear 10 is associated with a pair of elongated side pilers 12 and 13. Tricycle 10 is fixed to a harvester 14 and has a steerable rear wheel 16 mounted behind and centered transversely between two larger front wheels 18. All wheels are driven by hydraulic motors 20 and 22 (see FIG. 2) connected in a closed loop and parallel hydraulic system 24. The side pilers are unequal in length and pivoted to harvester 14 behind wheels 18. They are actuated by similar pairs of hydraulic cylinders 26 and 28 that are connected in an auxiliary closed loop and parallel hydraulic system 30 (see FIG. 3); cylinders 26 pivoting the pilers 12 and 13 between piling positions to the rear and sides of harvester 14, and cylinders 28 controlling the direction of fall of cut cane from the free ends of the pilers.

Figure 2:
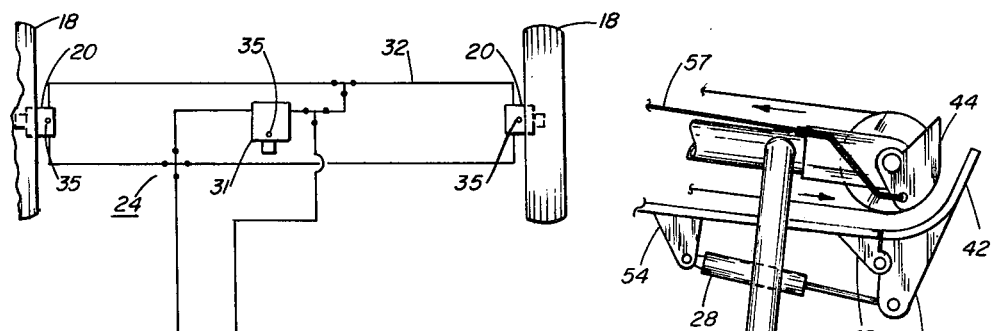
FIG. 2 is a block diagram of an hydraulic closed loop and parallel system of a prime mover drive for tricycle running gear.

Referring to FIG. 2, the parallel and closed loop system 24 connects two similar front wheel motors 20 in parallel with a variable, two-way hydraulic pump 31 in a closed loop 32. Rear Wheel motor 22 is smaller than motors 20 and is connected to pump 31 in a loop 34. Loops 32 and 34 are connected in parallel to form the closed loop parallel system 24. Hydraulic bleed lines and a hydraulic fluid tank are not shown, but bleed hole outlets 35 are indicated in FIG. 2 and connect with said tank. The respective wheel motors draw from system 24 hydraulic fluid in volumes required for all respective wheels to rotate the revolutions per minute to move at the same linear speed, and with torques dependent on hydraulic fluid pressures. Speeds and torques are also dependent on the relative sizes of hydraulic motors and cylinders. As a result the reduced size of the rear wheel and motor as connected in system 24 increases the rotational speed and reduces the torque to move the same linear distance as the larger front wheels and with less torque to prevent the loss of traction, and resulting skids.

Figure 4:
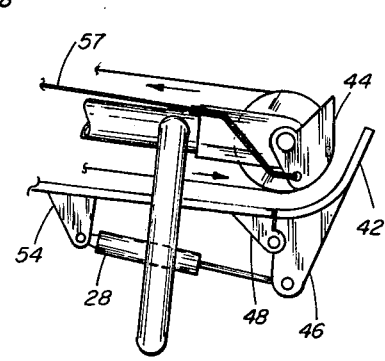
FIG. 4 is an enlarged fron elevation of the free end of a piler.
Figure 3:
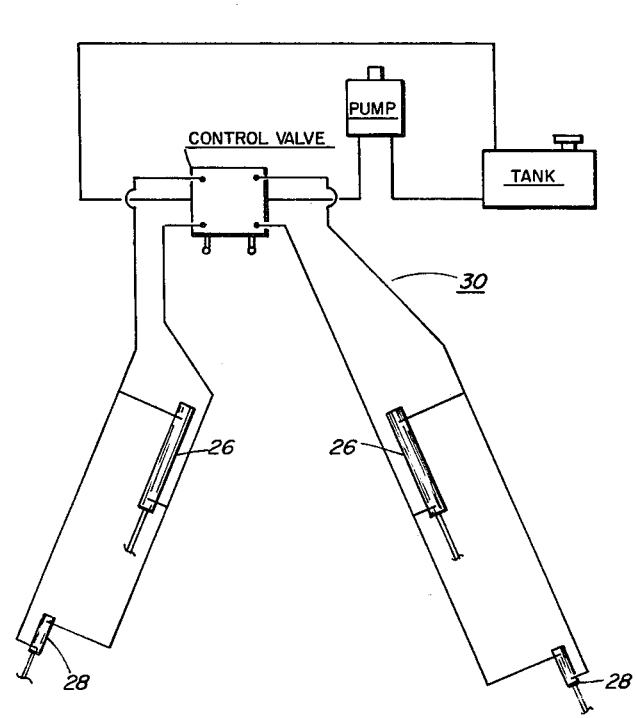
FIG. 3 is a block diagram similar to FIG. 2 of an auxiliary hydraulic closed loop and parallel system for actuating the pilers of the invention.

Referring now to FIGS. 1, 3 and 4, side pilers 12 and 13, one for each of the two rows of cane harvested simultaneously, are pivoted equidistantly forward of the rear wheel 16 by respective piler ends 36 and 38, to extend unequally aft for simultaneously piling cane from both rows behind rear wheel 16 without the falling cane from one row interfering with the fall of cane from the other row. Pilers are pivoted from positions for piling cut cane behind said rear wheel to respective piling positions to the outboard sides thereof by hydraulic cylinders 26 mounted between the pilers inboard sides and the adjacent outboard sides of the tricycle running gear. The free ends of the respective pilers are similarly equipped to control the fall of cut cane therefrom, and each comprises a rub bar arm 42 and a sticker chain wiper 44, respectively pivoted to opposing sides of the piler's free end, and each is adapted to cooperate for both to discharge cut cane transverse the cut rows behind harvester 14, and alternatively to discharge the cut cane transversely on both sides of the harvester. Rub bar arms 42 are each center curved for equal sides to define a concavity of approximately 105 degrees, and each is fixed by a convex edge of one of the equal sides to a projection 46 that is pivoted to a bracket 48 fixed on a pilers's outboard side 50 near its free end. Arm 42 is actuated by an hydraulic cylinder 28 pivoted between projection 46 and a support bracket 54 fixed forward of bracket 48 to a piler's outboard side for pivoting said arm outwardly around a piler's free end. Sticker chain wiper 44 is roughly triangular with a curved long side defining an approximately 90 degree curve adjacent a junction with a second side and is pivoted at said junction on the inboard side of said piler's free end and oppositely from arm 42 to form therewith a continuation of a cut cane passageway 56 through said piler. Wiper 44 is pivoted by a rod 57 extending between the wiper and a fixed projection 58 attached to the fixed end of the piler, and in cooperation with arm 42, discharge cut cane from the piler from passageway 56 transverse and in continuation thereof.

In operation the pairs of hydraulic cylinders 26 and 28 are sized and connected in an auxiliary closed loop and parallel hydraulic system 30 as shown in FIG. 3 for each of the pilers 12 and 13. Cylinder 26 requires approximately half of the pressure to pivot a piler as cylinder 28 requires to pivot a rub bar arm 42. As connected, cylinder 28 will not receive operating pressure until cylinder 26 bottoms out, that is completes its stroke, to position its associated piler. Rod 57 pivots sticker chain wiper 44 when the piler is pivoted by cylinder 26 and in coordination with arm 42 pivoted by cylinder 28 to discharge cut cane behind or on respective sides of the harvester, dependent on piler piot position.

What is claimed is:

1. In a two row harvester and piler, associated running gear and pilers comprising:
   (a) tricycle running gear, having two fixed front wheels and a smaller centered and steerable rear wheel, fixed as a movable supporting part of said harvester and piler for moving it from plact to place;
   (b) similar front wheel hydraulic motor means for driving said front wheels;
   (c) rear wheel hydraulic motor means, smaller than said front wheel motor means, for driving said rear wheel;
   (d) variable volume, two way hydraulic pump means connected to said front and rear wheel hydraulic motor means in closed loop and parallel hydraulic systems for supplying said wheel motor means with pressure fluid in volumes to rotate said wheels to move said harvester at common linear speeds, and at pressures in combination with relative difference in sizes of front and rear wheel motor means to rotate said front wheels with greater torque than said rear wheel;
   (e) piler means pivotally mounted on said tricycle running gear behind and inboard of said fixed front wheels to extend on each side of said centered rear wheel and rear wardly therebeyond for piling cut cane behind and to respective sides of said tricycle running gear.
   (f) cane fall directing means pivotally mounted on each of the free ends of said piler means for defining therebetween movable cut cane exit terminals and directing fall of cane therefrom; and
   (g) auxiliary hydraulic power means mounted on said tricycle running gear for pivoting said piler means to respective positions for piling behind and to the sides of said harvester and for conforming cane fall directiing means to said piling positions.

2. In a two row harvester and piler, associated running gear and pilers comprising:
   (a) tricycle running gear, having two fixed front weels and a smaller centered and steerable rear wheel, fixed as a movable supporting part of said harvester and piler for moving it from place to place;
   (b) hydraulic power means mounted on said tricycle running gear for driving said wheels thereof at a common linear speed and different torques;
   (c) piler means pivotally mounted on said tricycle running gear behind and inboard of said fixed front wheels to extend on each side of said centered rear wheel and rearwardly therebeyond for piling cut cane behind and to respective sides of said tricycle running gear;
   (d) rub bar arm means defining a concavity between opposite ends thereof and adapted to pivot around respective free ends of said piler means to define respective outboard sides of said exit terminals;
   (e) sticker chain wiper means triangularly shaped with longest side curved to define a convex side approximately symmetrical with said rub bar arms means concavity, and adapted to pivot on the free ends of said pilers to define respective inboard sides of said exit terminals, and so defined, said exit terminals are adapted to sequentially pile behind and to both sides of said tricycle running gear;
   (f) auxiliary hydraulic power means mounted on said tricycle running gear for pivoting said piler means to respective positions for piling behind and to the sides of said harvester and for conforming cane fall directing means to said piling positions; and
   (g) rod means respectively pivoted between said tricycle running gear at the respective fixed ends of said piler means and said sticker chain wiper means, said rod means being adapted to pivot said wiper means between approximately transverse and parallel with said respective piler means, as said piler means are pivoted from said rear piling to said side piling positions.

3. Associated running gear and piler as described in claim 2, wherein said auxiliary hydraulic power means comprise:
   (a) hydraulic cylinder means respectively pivoted between each said piler means and said running gear, and adapted with said cylinder means retracted to position said piler means approximately parallel with said running gear, for rear piling, and with cylinder means extended to position piler means angularly with said running gear for side piling;
   (b) small hydraulic cylinder means respectively pivoted between piler means adjacent respective free ends and respective rub bar arm means with said cylinder means extended and said rub bar arm means transverse said piler means, and with said cylinder means retracted in alignment therewith; and
   (c) hydraulic pump, tank and control valve means connected in a closed loop and parallel system with hydraulic and small hydraulic cylinder means for supplying said cylinder means with pressure fluid at pressures adapted to actuate said cylinder means in sequence, only of the small cylinder means after the hydraulic cylinder means, whereby said cane fall directing means are conformed to said piler means piling positions after said piler means are positioned.

* * * * *